March 7, 1944.   E. R. MAURER   2,343,312
POWER TRANSMISSION
Original Filed Oct. 9, 1940   3 Sheets-Sheet 1

INVENTOR
Edwin R. Maurer
BY Hames, Lind, Patu & Harris
ATTORNEYS.

March 7, 1944.　　　E. R. MAURER　　　2,343,312
POWER TRANSMISSION
Original Filed Oct. 9, 1940　　3 Sheets-Sheet 3

INVENTOR
Edwin R. Maurer.
BY Hamess, Dickey, Pierce & Harris
ATTORNEYS.

Patented Mar. 7, 1944

2,343,312

UNITED STATES PATENT OFFICE 2,343,312

POWER TRANSMISSION

Edwin R. Maurer, Detroit, Mich., assignor to Chrysler Corporation, Highland Park, Mich., a corporation of Delaware Original application October 9, 1940, Serial No. 360,461. Divided and this application April 2, 1942, Serial No. 437,311

7 Claims. (Cl. 74—336)

This application is a division of my co-pending application, Serial No. 360,461, filed on October 9, 1940.

This invention relates to power transmissions and refers more particularly to improvements in speed ratio changing mechanism especially adapted for use in motor vehicles.

My invention is applicable in its broader aspects to a variety of speed ratio gearing arrangements to provide speed changes above or below a direct drive from the vehicle engine shaft to the propeller shaft; however, I have illustrated the principles of the invention in connection with a transmission arrangement wherein both an underdrive and an overdrive mechanism are utilized.

The advantages of overdrive are well known in the art, especially since overdrive mechanisms have been widely used commercially in recent years. The co-pending application of Carl A. Neracher et al., 222,006, filed July 29, 1938, discloses an overdrive mechanism of an improved type wherein the change from a slower to a faster drive is accomplished automatically at a predetermined vehicle speed by operation of a power actuated brake which locks the sun gear of a planetary gearset to the casing thereby effecting a step-up in the driving ratio while driving. The aforesaid overdrive unit is intended to be used in connection with a conventional manually operated transmission. While a material improvement in the art is accomplished by the use of such an arrangement, it is still necessary, for satisfactory vehicle performance, to shift gears by hand.

It is an object of the present invention to provide an improved change speed mechanism which during overdrive shall be fully automatic in operation and wherein changes in speed ratio may be obtained without the necessity for manual operation, either in shifting up or down, except that ordinarily required in manipulating the vehicle throttle mechanism.

My improved transmission is preferably arranged so that two changes in speed ratio may be obtained in forward drive, thus providing a driving arrangement which does not differ from that in conventional use in its general functions. Both of the speed ratio changes are obtained automatically, one upon the vehicle reaching a predetermined speed and the other upon driver release of the throttle control while the vehicle is traveling above a predetermined speed higher than that necessary for the said one shift to take place.

The mechanism is further arranged so that a shift down to a lower speed ratio, for faster acceleration or for other reasons, while the vehicle is traveling above the aforesaid higher predetermined speed may be quickly and smoothly accomplished by depression of the vehicle accelerator pedal to an overtravel position or by other equivalent control means.

It is, therefore, a further object of the invention to provide an improved speed change mechanism wherein one step-up in the driving ratio may be obtained instantaneously upon the attainment of a predetermined vehicle speed and a second step-up in the drive may be obtained upon momentary reversal of the driving torque when the vehicle is traveling at a speed in excess of a predetermined speed higher than that at which the first step-up is obtained.

A still further object is to provide a transmission of the aforesaid type wherein an instantaneous "kickdown" may be obtained to a lower speed driving ratio from either of two higher speed driving ratios.

A still further object is to provide a three-speed ratio transmission wherein one step-up in ratio is effected during drive and the other is effected during coast of the vehicle.

A still further object is to provide in such a transmission, means for obtaining an instantaneous shift to a lower speed ratio from either of two higher speed ratios without necessitating an interruption of the vehicle drive.

An additional object is to provide a vehicle transmission of the aforesaid type capable of manipulation to provide a two-way reduced speed drive without free-wheeling whereby the engine may be used as a brake on long descents.

Other objects of my invention are to provide improved change speed mechanism automatically operable to provide varying speed ratios best suited to the requirements or conditions of motor vehicle drive under such conditions that high efficiency may be obtained without sacrifice of accelerating ability.

Further objects and advantages of my invention will become apparent from the following specification, reference being had to the accompanying drawings which illustrate two of the many possible embodiments thereof, and wherein, Fig. 1 is a longitudinal vertical section of the forward gearbox of my improved transmission.

Figure 1:
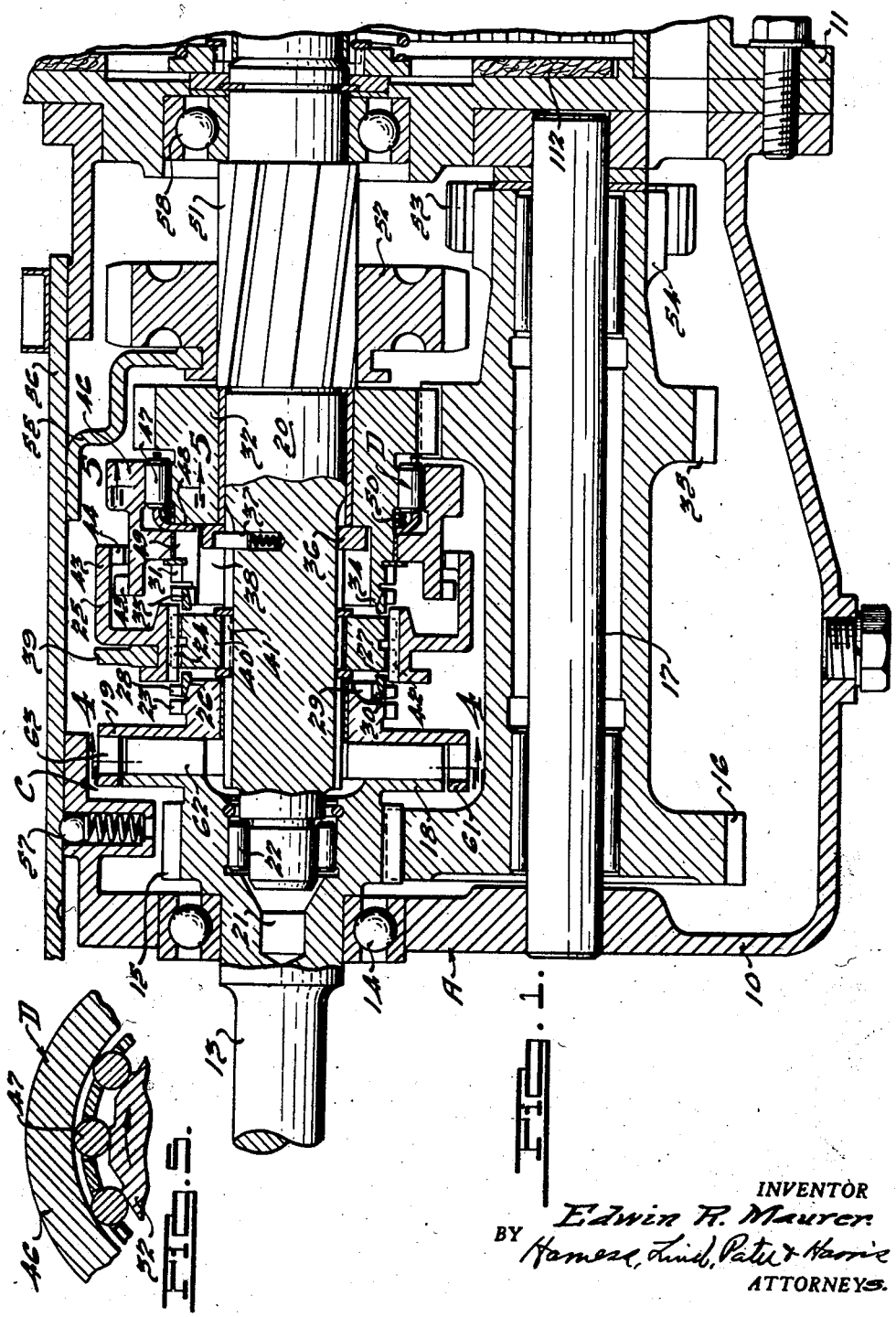
Figure 3:
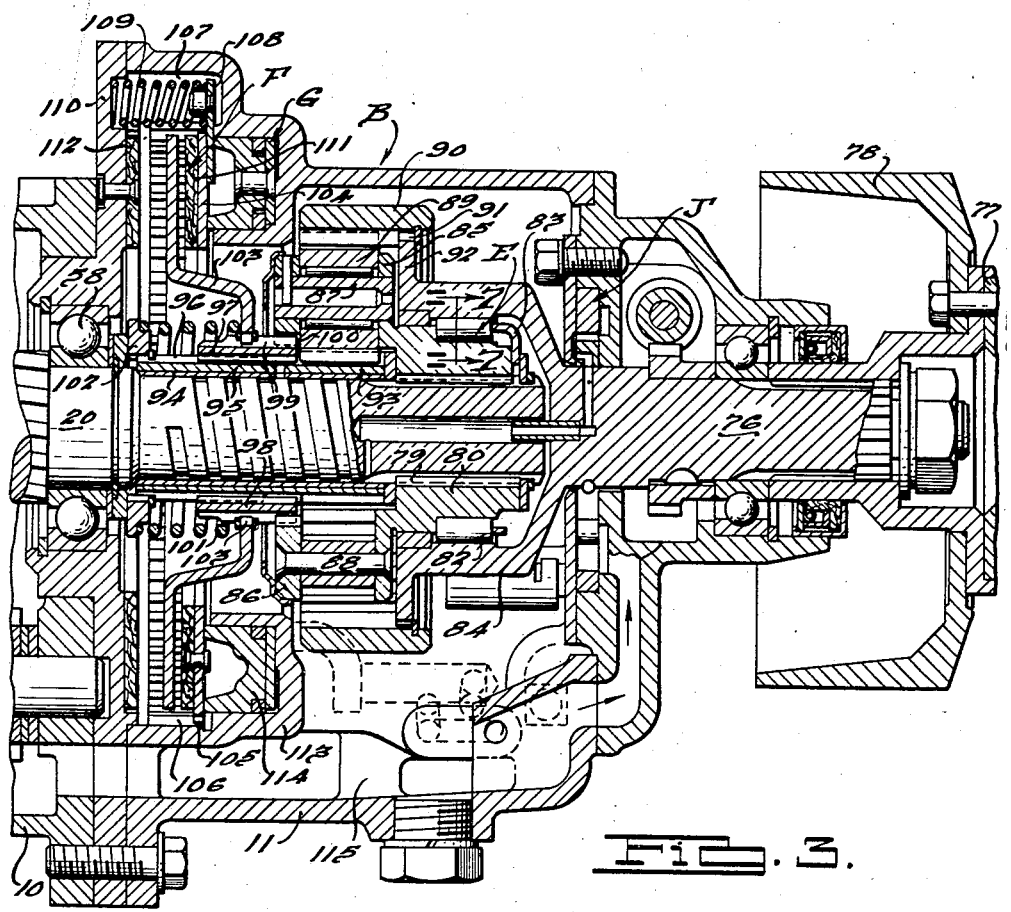
Fig. 3 is a longitudinal vertical section of the rearward gearbox of my improved transmission which is adapted to be used with either of the forward boxes of Figs. 1 and 2.
Figures 4, 7:
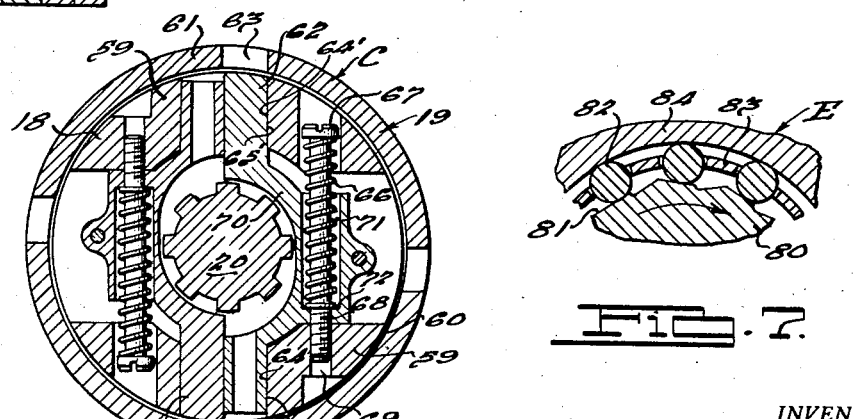

Fig. 4 is a section along line 4—4 of Fig. 1.
Fig. 5 is a part section along line 5—5 of Fig. 1.
Fig. 6 is a part section along line 6—6 of Fig. 2.
Fig. 7 is a part section along line 7—7 of Fig. 3.

Figure 2:
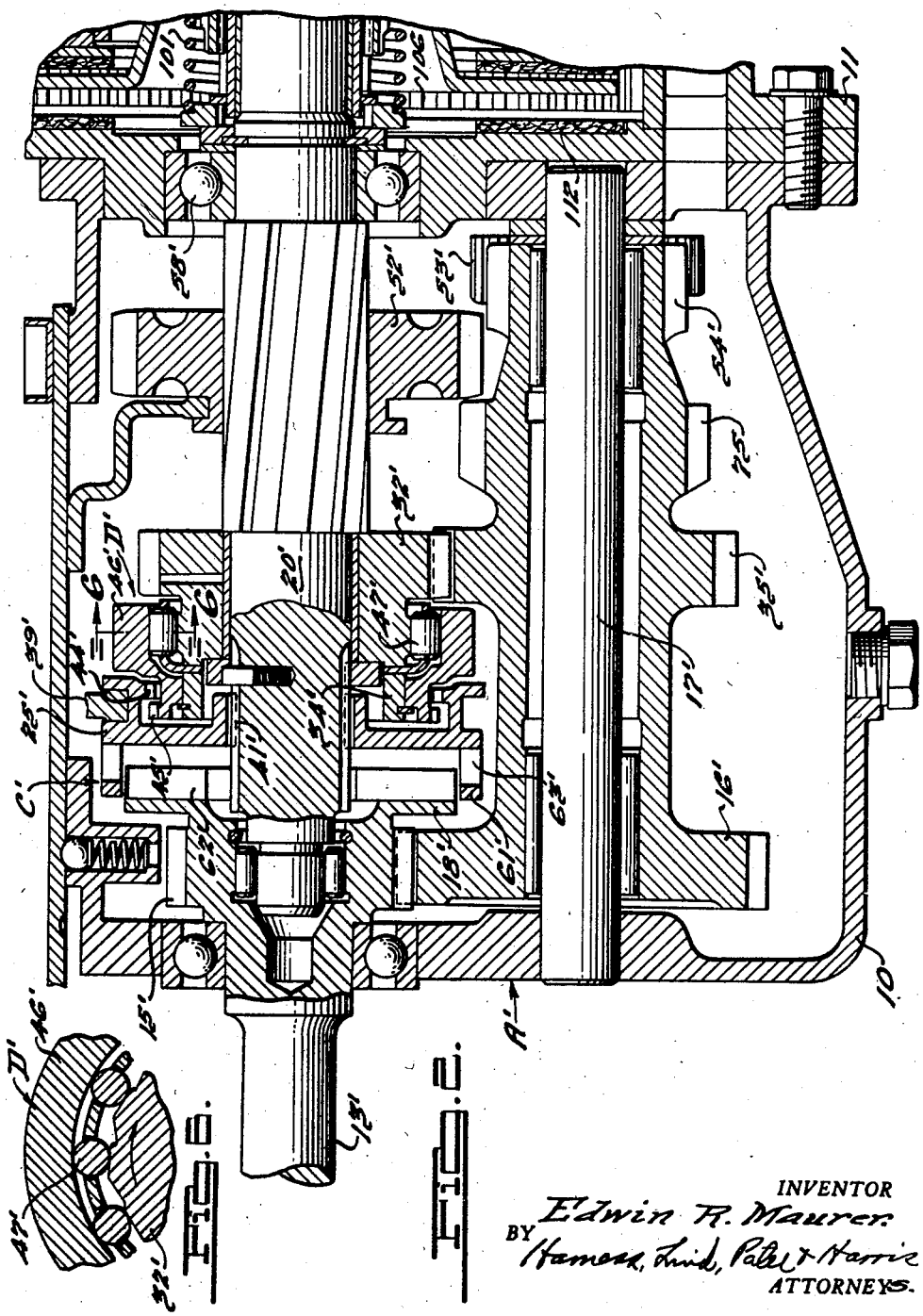
Fig. 2 is a view similar to Fig. 1 of a modified form of forward gearbox.

In the drawings in which like reference numerals designate corresponding parts in the following description, I have illustrated my improved transmission as consisting of a forward gearbox A (Fig. 1) and a rear gearbox B (Fig. 3). Fig. 2 illustrates a modified form of forward gearbox A' which is designed to be used in place of gearbox A if desired. For convenience, the unit A will be referred to as the "underdrive" unit and the unit B as the "overdrive" unit. While each of these units are shown enclosed in separate casings 10 and 11, it is to be understood that such an arrangement is purely optional and one single casing for both units may be used if preferred.

Referring now to Fig. 1, it may be seen that the input shaft 13 is rotatably supported in the casing 10 by a ball bearing 14 and has a gear 15 formed on its inner end. The gear 15 meshes with a cluster gear 16 carried for rotation on a countershaft 17 which is supported at its opposite ends in the casing 10. Also formed on the inner end of the shaft 13 is a pawl carrier 18 which forms part of a centrifugal clutch C more clearly illustrated in Fig. 4.

The female or driven member 19 of clutch C is carried by an intermediate driven shaft 20 which is piloted at its forward end into the hollowed out portion 21 of shaft 13 where it is supported by bearing rollers 22. The member 19 is journaled on the shaft 20 and has integral clutch teeth 23 adapted for engagement by clutch teeth 24 carried by a shiftable sleeve 25. Member 19 is also provided with a cone-shaped surface 26 on which is carried a synchronizing and blocker element 27 having teeth 28. A slot 29 cut in the member 19 receives a tab 30 formed on the element 27 and permits the latter to have limited rotation relative to the hub of member 19 for blocking purposes. Combined synchronizing and blocking mechanisms of this general type are well known in the art, and inasmuch as the specific type used is immaterial here, the aforesaid brief description will be deemed sufficient.

The sleeve 25 is adapted for shifting forwardly to mesh the teeth 24 thereof with the teeth 23 or rearwardly to mesh the teeth 24 with the clutch teeth 31 carried by the gear 32. A synchronizing-blocking element 33 similar to the element 27 is carried by the hub portion 34 of gear 32. Gear 32 is journaled on shaft 20 and meshes with countershaft cluster gear 35. A lock ring 36 retained in place by a spring pressed pin 37 retains the gear 32 in position, a suitable enlargement of the bore, designated by numeral 38 on the drawing, being provided in the gear hub to accommodate the same.

The sleeve 25 is adapted to be shifted into engagement with the teeth 23 or 31 by a shift yoke 39, the latter being connected to a shift rail (not shown) for shifting under the control of suitable driver actuated shifting mechanism; and is slidably carried on a hub member 40 which is splined to the shaft 20 at 41. The hub member 40 is provided with external spline teeth 42 which slidably mesh with the teeth 24 of shift sleeve 25. Sleeve 25 is also provided with an integral rearwardly extending cylindrical portion 43 provided with inwardly extending clutch teeth 44 which are adapted to mesh with clutch teeth 45 when the shift sleeve is shifted forwardly to mesh the teeth 24 with teeth 23.

The clutch teeth 45 are carried by a sleeve member 46 which is rotatably carried on the hub portion 34 of gear 32. An overrunning clutch, generally designated by the letter D, forms a one-way driving connection between the sleeve 46 and gear 32 and is adapted to drivingly lock these two members together upon tendency of the gear 32 to rotate faster than the sleeve 46 in a forward direction while permitting overrun of the sleeve with respect to the gear. The clutch D (Fig. 5) is of the usual type and is provided with rollers 47 and a carrier having tabs 48 receivable into slots 49 milled in the hub 34 for establishing a lost motion driving connection with the gear 32. A spring 50 biases the rollers into lock-up position whenever the gear 32 tends to rotate faster than sleeve 46.

Rearwardly of the gear 32 the shaft 20 is provided with a splined portion 51 on which is slidably carried a reverse driving gear 52 adapted to be meshed with an idler gear 53 under the control of a shift yoke 55 which is in turn connected to a shift rail 56, the latter being retained in one or the other of its shifted positions by a spring pressed detent ball 57. The idler gear 53 is suitably mounted in the casing 10 and is permanently meshed with countershaft cluster gear 54.

Referring now to the details of clutch C which is preferably of the centrifugal type, one form of which is shown in Fig. 4, the enlarged portion 18 of the shaft 13 is provided with pawl guides 59 which have arcuate faces 60 fitting within the overhanging shell portion 61 of clutch member 19. Slidably secured to the portions 59 are a pair of pawls 62 which are adapted for outward movement oppositely to one another to engage slots 63 provided in the portion 61 of clutch member 19. Each of the pawls has a pair of faces 64—64' in sliding engagement with faces 65—65' respectively of members 59 as shown in Fig. 4. The pawls are oppositely disposed relative to one another and the opposite faces thereof slidably engage one another. In order to normally urge the pawls inwardly of the pawl cage formed by the portions 59 of the member 18 to the position shown in Fig. 4, springs 66 are provided, each spring acting upon the head 67 of screw bolt 68 threadedly engaging opening 69 provided in portions 59 and the portions 70 of the pawls are respectively provided with an opening 71, each spring 66 acting on a seat 72 of the associated yoke portion.

The portion 61 has the aforesaid plurality of circumferentially spaced pawl receiving slots or openings 63 suitably spaced so that diametrically arranged paths of slots will simultaneously register with the pawls 62 so as to receive the pawls under conditions hereinafter to be described.

Each of the heads 67 of the bolts 68 is provided with a slot which is adapted to receive a screw driver for adjustment of the tension of the spring 66, it being apparent that such adjustment may readily be accomplished without disassembling the mechanism by aligning each of the bolt heads 67 with one of the slots 63. The pawls 62 are slightly rounded at their outer edges to reduce ratcheting during rotation of the member 19 at a greater speed than member 18 after speed has been reached at which the centrifugal force tends to move the pawls outwardly having overcome the resistance of the spring 66. When the pawls 62 move outwardly in their slots 63, such movement is limited by engagement of the yoke portion 70 thereof with the portions 59, the yoke portion sliding on the bolts 68.

It may thus be seen that with the sleeve 25 positioned as shown in Fig. 1, the underdrive unit A is set in neutral and upon rotation of the shaft 13 by the vehicle engine, no drive will be transmitted to intermediate shaft 20. However, if sleeve 25 is moved forwardly or to the left of Fig. 1 by shift yoke 39 which as aforesaid is adapted to be controlled by any suitable type of driver actuated manual shift mechanism, teeth 24 will be meshed with teeth 23 and teeth 44 will be meshed with teeth 45. A torque multiplying drive will then be transmitted between the shafts 13 and 20 through gears 15, 16 and 35, gear 32 overrunning clutch D, sleeve 46, sleeve 25 and hub 40. In addition, clutch member 19 will be rotated at the speed of shaft 20. When the vehicle attains a speed of approximately 22 M. P. H. (or any other predetermined speed conditioned upon adjustment of the spring 66); the pawls 62 will tend to move outwardly under the influence of centrifugal force and to engage the slot 63 formed in the clutch member 19. However, as the clutch member 19 is rotating at a considerably lower speed than the member 18 which carries the pawls 62, the parts pass each other with such rapidity that the pawls do not have time to move outwardly to engage the slots and the parts continue to slip past one another until the operator momentarily releases or diminishes the torque of the engine applied to the shaft 13 so as to permit the member 18 to decelerate by reason of the action of the overrunning clutch D which permits overrun of the sleeve 46 with respect to the gear 32. In decelerating, the member 18 obviously very quickly drops to the speed of the member 19 momentarily synchronizing the pawls with a pair of the diametrically arranged slots 63, the pawls thereupon being guided outwardly during rotation thereof and effecting engagement with the slots 63. Once engaged, the centrifugal force acting on the pawls carries them outwardly to the limit of their outward movement as determined by engagement of the yoke portions 70 thereof with the portions 59 of member 18 and thus upon resumption of the driving occasioned by the vehicle driver depressing the engine throttle, direct drive is established between the shafts 13 and 20 with the overrunning clutch D permitting the sleeve 46 to overrun the gear 20.

Shifting of the sleeve 25 rearwardly or to the right of Fig. 1 will mesh the teeth 24 with the teeth 31 formed on the hub portion 34 of the gear 32 and a direct two-way drive will be established between the gear 32 and the shaft 20 by way of hub member 40 and sleeve 25. When the sleeve 25 is in this position, release of the vehicle throttle control for any reason will not establish an automatic step-up to direct drive because the clutch member 19 is freely rotatable on the shaft 20 and has no driving connection therewith and because of the direct connection between the gear 32 and the shaft 20, the overrunning clutch D is locked out of the driving system and the shaft 20 will drive the shaft 13 upon coasting through gears 35, 16 and 15. The torque multiplying gear ratio drive established by movement of the sleeve 25 rearwardly is the same as that established by the movement of sleeve 25 forwardly, the difference being solely in the action of the parts upon release of the vehicle throttle to permit coasting of the vehicle. Thus it can be seen that when the sleeve 25 is in its rearward position, a permanent torque multiplying underdrive is established which will remain established during all conditions of vehicle drive regardless of the speed thereof and regardless of whether or not the vehicle is driving or coasting. Movement of the sleeve 25 to its rearward position established what may be termed a permanent underdrive for use under various vehicle operating conditions such as when it is desired to negotiate sandy or snow-filled roads or to accelerate above the cut-in speed of the clutch C or to descend long grades using the engine as a brake.

Fig. 2 shows a modification of the arrangement of Fig. 1 and in the description thereof, parts corresponding to similar parts in the Fig. 1 form will be referred to by the same numeral with the addition of a prime.

In Fig. 2, the input shaft 13' of underdrive unit A' has a gear 15' formed integrally thereon which meshes with countershaft cluster gear 16' carried on countershaft 17'. The shaft 13' also carries the integral pawl cage 18', which in turn, carries the pawls 62' and their associated mechanism, all of which is preferably like that shown in Fig. 4.

Countershaft 17' also carries a plurality of additional cluster gears 35', 75 and 54', respectively. Gear 35' meshes with a gear 32' journaled on the intermediate shaft 20'; gear 75 is adapted to be engaged by gear 52' which is slidably splined on shaft 20' for establishing a low speed drive through the unit A'; and gear 54' is adapted to drive the vehicle in reverse when the gear 52' is engaged with idler gear 53' which is in constant mesh with gear 54'.

The gear 32' is provided with an integral hub portion 34' which is adapted to form one element of a one-way overrunning clutch D' and the extreme forward portion thereof journals a sleeve member 46' having clutch teeth 45' adapted for engagement by the clutch teeth 44' of a shiftable sleeve 25'. The latter is shiftable under the influence of a shift yoke 39' and is splined on the shaft 20' at 41'. Sleeve 25' also has a forwardly extending portion 61' provided with slots 63' for engagement by the pawls 62' of centrifugal clutch C'.

Fig. 2 shows the parts in neutral position and upon rotation of input shaft 13', countershaft cluster gears 16', 35', 75 and 54', idler gear 53', gear 32', and sleeve 46' will be rotated. By means of any suitable remote shift mechanism (in combination with a releasable clutch or other device for temporarily arresting rotation of shaft 13') gear 52' may be shifted into mesh with either gear 75 to establish low speed drive, or with gear 53' to establish reverse drive. Both low and reverse are two-way drives and should the speed of the vehicle exceed the cut-in speed of clutch C' in low or reverse, the pawls 62' will be prevented from moving outwardly by the portion 61' of shift sleeve 25' which blocks outward movement of the pawls when in neutral.

Inasmuch as it is intended that gear 75 will be used infrequently as an emergency low speed gear, no synchromesh means is provided between clutch teeth 44' and 45' but, if desired, suitable synchronizing means may be mounted between the aforesaid teeth for assisting the shift thereof.

Shift of sleeve 25 forwardly will engage the teeth 44' and 45' and at the same time align the slots 63' with the pawls 62' to thereby facilitate engagement of the clutch C' upon the attainment of a predetermined speed. Thus, the shaft 20' will be driven from shaft 13' through gears 15', 16', 35' and 32'; clutch D'; sleeve 46' and sleeve 25'. Upon reaching the predetermined speed necessary for the pawls 62' to overcome the pressure of their holding springs, reversal of torque through the unit A' will permit the cage 18', which is of course rotating faster than shaft 20', to slow down through the action of overrunning clutch D'; thereupon pawls 62' will move outwardly of cage 18' and engage slots 63' effecting a direct drive connection between shafts 13' and 20'. During direct drive, the sleeve 46' will overrun gear 32', the rollers of clutch D' being in released position.

It is therefore apparent that underdrive unit A' differs from underdrive unit A in one important particular, i. e., an additional underdrive ratio is provided in unit A' which may be used for emergency starting conditions where a very low ratio is desirable, and for descending grades where it is desired to use engine braking. It is, of course, obvious that a gear similar to 75 in Fig. 2 could be incorporated in the Fig. 1 modification to provide an additional underdrive ratio if desired.

Having thus described the underdrive unit of my improved transmission, attention is now directed to Fig. 3 which illustrates the overdrive unit, which unit is adapted for use with either the underdrive unit A or the underdrive unit A'.

As is apparent from Figs. 1 and 3, the intermediate transmission shaft 20 (which corresponds to 20' in Fig. 2) is supported in the rear end wall of casing 10 by an anti-friction thrust bearing 58 and has a rearwardly extending reduced portion extending into casing 11 of unit B. The overdrive mechanism is interposed between the shaft 20 and a tailshaft 76, the latter having an extension 77 extending rearwardly to drive the rear wheels (not shown). The customary propeller shaft brake drum 78 is illustrated as comprising a part of the coupling means between shafts 76 and 77, but other suitable arrangements are equally effective.

The intermediate transmission shaft 20 is a driving shaft for the overdrive mechanism B and, as aforesaid, is journaled in the bearing 58 carried by the rear end wall of the casing 10. The shaft 20 has a rearward extension which projects into the overdrive unit casing 11 and has splines 79 formed on the extreme rearward portion thereof.

Engaging splines 79 at the rear end of the rearward extension of the shaft 20 is the inner member 80 of an overrunning clutch E (Fig. 7) which provides a releasable forward direct driving means from shaft 20 to driven shaft 76. The overrunning clutch E functions only at such times when the two-way direct drive means does not operate for any reason as will presently be apparent. Normally, this overrunning clutch E plays a very minor part in the mechanism. As best shown in Fig. 7, the inner member 80 is formed with the usual cam faces 81 engaged by clutching rollers 82, the rollers being spaced by the usual cage member 83. The other member of the overrunning clutch E comprises a cylinder 84 formed as an enlarged forward projection of the driven shaft 76. When the driving shaft 20 has a forward direction of rotation imparted thereto, as indicated by the arrows in Fig. 7, and with the overdriving mechanism inoperative, the rollers 83 will be wedged between the inner and outer members 80 and 84, respectively, of the overrunning clutch E so that the drive shaft 76 will be driven in a forward direction with the intermediate driving shaft 20. However, in the event that the driving shaft tends to slow down relative to the driven shaft or in the event that the driven shaft tends to rotate forwardly faster than the driving shaft, the rollers 82 will be released from wedging action and such tendencies of the shaft to rotate relatively to one another will be readily accommodated.

Overdrive mechanism B is arranged to provide a plurality of speed ratio drives between intermediate driving shaft 20 and driven shaft 76 and in the illustrated embodiment, I have provided a relatively slow speed drive which is a direct or 1 to 1 ratio drive and a relatively fast drive which provides an overspeed drive whereby the driven shaft is rotated faster than the driving shaft. Planetary gearing is preferably employed because of the recognized advantages of quietness of operation, simplicity, etc., although, if desired, other forms of gearing may be employed. The planetary gearing comprises an input planet pinion carrier structure 85 adapted to be driven directly from shaft 20, this carrier structure being conveniently formed as an extension of the overrunning clutch cam member 80. The carrier structure is provided with a forward carrier portion 86 connected to the portion 85 by a plurality of axle shafts 87 and spacing assemblies 88, one of these axles and spacing assemblies being illustrated in Fig. 3.

Rotatably journaled on each axle 87 is a planet pinion 89 meshing with an internal gear 90 drivingly secured at the splines 91 with a flanged extension 92 of the aforesaid driven shaft extension 84 of the overrunning clutch E. The planet pinions 89 also mesh with a hollow sun gear 95 having an internal lining of bearing material 94 whereby the sun gear is loosely journaled on the intermediate driving shaft 20 forwardly of the splines 79. The sun gear has a forwardly extending controlling hub 95 formed with axially extending splines 96 slidably engaging the internal splines 97 of a shiftable drive controlling sleeve 98 formed with external clutch teeth 99 adapted to clutchingly engage corresponding internal clutch teeth 100 formed on carrier member 86.

When the sleeve 98 moves rearwardly to clutch with the carrier portion 86, the teeth 99 and 100 are so constructed that they may relatively overrun without danger of injury thereto, the said teeth being so constructed that they will engage only when they are rotating synchronously. The direction of inclination is such as to permit the carrier member 86 to rotate forwardly at a speed faster than forward rotation of the sun gear 93, the teeth 100 camming over the teeth 99. This structure is more fully described in the aforesaid Neracher application, Serial No. 222,006.

In order to provide means for yieldingly urging rearward movement of sleeve 98 to effect clutching thereof with carrier portion 86, I have provided yielding means in the form of a spring 101 acting between an abutment 102 and a disk 103, the inner portion of which is fixed to sleeve 98 by a splined engagement at 103' therewith. This disk 103 provides a braking element for arresting rotation of the sun gear 93 when the sleeve 98 is moved forwardly to disengage clutch teeth 99 and 100 in order to effect the over speed drive between shaft 20 and shaft 76. Means is provided, preferably operated by pressure fluid, for shifting the disk 103 and sleeve 98 forwardly in opposition to spring 101, the arrangement being such that this shifting action of the sleeve and disk will take place even during a full torque application of the vehicle engine in driving the intermediate driven shaft 20 without requiring reduction or reversal of the engine torque as has heretofore been common in connection with transmissions of this type.

The pressure fluid operated means comprises a braking device generally designated at F adapted to be actuated to brake the disk 103 by a pressure fluid operated motor designated generally at G. The braking device F comprises a pressure plate 104 externally splined at 105 to engage the internal splines 106 formed on the casing 11, the splines being interrupted at the outwardly extending casing pockets 107 into which project fingers 108 which are welded to the pressure plate 104. A coil spring 109 acts in each of the said pockets 107 between the casing wall member 110 and a finger 108 to yieldingly urge the pressure plate 104 rearwardly to its released position, this pressure plate carrying on its forward face a ring of friction braking material 111 engageable with the rear face of the disk 103. The forward face of the disk 103 is adapted to engage the braking material 112 fixed to the casing wall member 110 by suitable rivets as illustrated in Fig. 3.

The fluid pressure motor G comprises a plurality of annular cylinders 113 formed as a part of the casing structure 11 and opening forwardly to slidably receive annular piston assemblies 114 which engage the pressure plate 104 directly to urge the same forwardly when pressure fluid is introduced into the said cylinders. Thus, when pressure fluid is introduced into the cylinders at the rear of the respective pistons, the said pistons are moved forwardly in the cylinders causing the pressure plate 104 to slide forwardly in the splines 106 and into engagement with disk 103, this disk and the sleeve 98 then moving forwardly as a unit to disengage clutch teeth 99 from carrier clutch teeth 100 and bringing the disk 103 into braking engagement with the friction material 112 against the action of the coil springs 101 and 109 to thereby securely hold the sun gear 93 against rotation.

When the pressure of the fluid in the cylinder 113 is relieved or when the pressure drops below that required to maintain brake F in operation as, for instance, when the speed of the vehicle drops below that which is necessary to rotate pump J at a speed sufficient to provide the necessary pressure, springs 101 and 109 will operate to return the parts to their illustrated positions in Fig. 3, the spring 109 acting to separate the friction material 111 from the disk 103 while the spring 101 yieldingly urges clutching engagement of teeth 99 with teeth 100. When the sleeve 98 is in its Fig. 3 clutched position, rearward movement thereof is preferably limited by engagement of the sleeve with the teeth of the sun gear whereby the teeth 99 are prevented from contacting with the teeth of the planet pinions 89.

In the operation of the overdrive mechanism as thus far described, and assuming a forward rotation of the intermediate shaft 20 with the parts positioned as illustrated in Fig. 3, a direct drive will be transmitted between the shaft 20 and shaft 76 because sleeve 98 is operative to clutch the sun gear 93 with carrier 86 thereby locking the planetary gear train and causing the same to revolve as a unit with the shafts 20 and 76 to thus provide a two-way direct drive through the unit B.

Let it be assumed that while the aforesaid direct drive is taking place by application of torque from the vehicle engine, pressure fluid is introduced into the cylinders 113 by suitable control means such as that fully described and claimed in the aforesaid Neracher application, Serial No. 222,006. This will cause operation of the motor G to shift sleeve 98 forwardly thereby disengaging clutch teeth 99 and 100 and releasing the sun gear 93 from the carrier 86, the sun gear then immediately being arrested against rotation by operation of the braking device F. This operation will establish an over speed drive between the shafts 20 and 76 which will be accompanied by reversed rotation of the intermediate driving shaft 20 by an amount equal to the value of the overdrive gear train when the braking device F operates to hold the sun gear 93 and planet pinions 89 will be driven forwardly around a fixed sun gear 93, thereby causing the driven shaft 76 to rotate forwardly faster than the speed of the driving shaft, clutch E overrunning to accommodate such drive.

Whenever the pressure of the fluid in cylinders 113 drops below the critical pressure required to operate braking device F, either by manipulation of the aforementioned control means or by a slowing down of the speed of pump J, the braking device F will be released and a step-down will take place in the mechanism D changing the drive therethrough from overspeed drive to direct drive. This change in the speed ratio drive may take place under any conditions of vehicle operation. Upon venting of the cylinders 113, it will be apparent that braking device F will be released, spring 101 moving disk 103 and sleeve 98 rearwardly. When the braking device F releases the sun gear 93 and sleeve 98 which was previously held against rotation now quickly accelerate forwardly at the time the sleeve 98 is shifted rearwardly. It will frequently occur that the sleeve 98 will be accelerated to a speed equal to that of the carrier 86 so that the sleeve will clutch with the carrier to provide the direct drive under the aforesaid operating conditions. However, should the teeth 99 not clutch with the teeth 100, the sleeve 98 cannot rotate forwardly faster than the carrier 86 because the overruning clutch E will immediately come into operation to establish the direct drive from driving shaft 20 to the driven shaft 76.

When the overruning device E thus operates, the teeth 99 which are of the well-known Maybach type will engage the forward faces of the teeth 100 but will not clutch therewith and the next time that the torque through the unit B is partially or wholly reversed (by driver release of the accelerator pedal or by other means) the shaft 20 will tend to overrun the shaft 76 through the clutch E and the spring 101 will then act to force the sleeve 98 rearwardly thereby clutching the teeth 99 and 100. This action is more fully described in the aforesaid copending Neracher application.

In driving the vehicle in reverse by manipulation of the manually controllable shift mechanism to engage gear 52 with reverse idler gear 53 in underdrive unit A (or by engagement of gear 52' with reverse idler 53' in underdrive unit A') the overdrive mechanism B operates in such manner that lock-up means for the overrunning clutch E is not required. The vehicle is necessarily brought to a standstill before the reverse driving gears are engaged and inasmuch as pressure fluid to the motor G is supplied by a pump J driven by the tailshaft 76, it will be apparent that when the vehicle is at rest, the pump J is stationary and the pressure in the cylinders 113 will be zero. The braking device F will therefore be released and the sleeve 98 will be moved rearwardly by the spring 101 to lock up the planetary train thereby providing a two-way drive between the shafts 20 and 76.

The pump J and its associated control mechanism which includes means for venting the cylinders 113 under various conditions of vehicle operation is fully described and claimed in the aforesaid copending Neracher application and, inasmuch as it is considered that the details thereof are immaterial to the present invention, the description will not be repeated, it being sufficient to state that the pressure fluid control means is preferably arranged so that when the vehicle is accelerated in direct drive through the mechanism B to a predetermined desired speed, pressure from the pump J will automatically cause operation of the motor G to effect change in the mechanism B from direct drive to over speed drive. Likewise, when the speed of travel of the vehicle drops below a desired predetermined critical speed, the pressure of the fluid in motor G will drop causing the over speed drive to be automatically released and the direct drive to immediately take place as the shaft 20 speeds up either by engagement of the overrunning clutch E or by engagement of the sleeve 98 with the carrier 86 as has been described. It is also contemplated that in the operation of the transmission suitable means will be provided for venting the cylinders 113 at the will of the driver such that immediate return to direct drive through the mechanism B can be accomplished by kickdown operation of the vehicle accelerator pedal or by other suitable control mechanism.

In the normal operation of the power transmission as a whole, let it be assumed that the motor vehicle is at rest with the mechanism in underdrive unit A position as shown in Fig. 1 and the mechanism in overdrive unit B as shown in Fig. 3. Forward drive may be initiated by manipulation of the sleeve 25 in unit A (accompanied, of course, by a release of the engine drive to the shaft 13 by operation of a suitable friction clutch or by other suitable means) to engage the teeth 24 of the said sleeve with either the teeth 23 of member 19 or the teeth 31 of gear 32. It will be assumed that normal operation of the transmission is contemplated and that the sleeve 25 is manipulated forwardly to engage with the member 19. Teeth 44 will, of course, also be engaged with the teeth 45 and upon acceleration of the vehicle, drive will be transmitted from the shaft 13 through gears 15, 16, 35 and 32, overrunning clutch D, sleeve 46, sleeve 25 and hub 40 to shaft 20, thence to shaft 76 through clutch member 80 and sun gear 93, the sleeve 98 being positioned as shown in Fig. 3 with the planetary gear train locked up to rotate as a unit. If for any reason the teeth 99 and 100 should not be engaged, direct drive through the unit B will, of course, be transmitted from shaft 20 to shaft 76 through overrunning clutch E.

As the vehicle accelerates, the pump J will build up fluid pressure under control of suitable valve mechanism until the predetermined vehicle speed has been reached at which shift to overdrive in the unit B is desired to take place. At such time, fluid pressure will be introduced into the cylinders 113 of motor G and braking device F will be actuated to disengage clutch teeth 99 and 100 to lock the sun gear 93 against rotation through the lock means 103, 98, 95. It will thus be seen that a step-up in the speed ratio between the shafts 13 and 76 has been effected automatically and without the necessity for the driver taking conscious action; the vehicle now being driven to underdrive through the unit A and at an over speed drive through the unit B. Continued acceleration of the vehicle to a speed above that which is necessary for centrifugal action to overcome the resistance of the springs 66 which control the action of the pawls 62 of centrifugal clutch C may be continued and the pawls 62 will rotate past the pawl receiving slot 63 without engagement therewith because of the differences in speed between the members 18 and 19. The vehicle is then being driven under conditions somewhat similar to that obtained in conventional transmissions when the vehicle is being accelerated in second or intermediate speed drive. Direct drive through the mechanism A may be obtained at any time when the vehicle is traveling above the critical speed at which the centrifugal clutch C is designed to operate by momentary reversal of torque through the underdrive unit A such as may be accomplished by driver release of the accelerator pedal. Upon reversal of torque through unit A, shaft 13 and its associated mechanism will rapidly decrease in speed, this action being accommodated by overrun at the clutch D and the pawl carrying cage 18 will rapidly drop in speed until it is rotating at the speed of the member 19 which carries the pawl receiving slot 63. At the instant of synchronization of the members 18 and 19, the pawls 62 will move outwardly and engage the slots 63 thereupon establishing a direct drive between the shaft 13 and the shaft 20. Acceleration of the vehicle will now cause it to be driven at the fastest speed ratio obtainable with the herein described transmission, direct drive having been established in the unit A and overdrive having been established in the unit B.

As has been mentioned before, it is contemplated that a relatively fast ratio, in the neighborhood of 3.5 or thereabouts, will be used with the herein described transmission arrangement and thus the advantages of low engine speed at vehicle cruising speeds will be secured. It is also preferable, though not necessary, that some form of slip clutch such as a fluid coupling be employed to transmit the drive from the vehicle engine to the shaft 13. The advantages of the fluid coupling are well-known and when used in combination with the herein described transmission, a remarkably fast break-away from standstill condition is possible because of the fact that the fluid coupling inherently permits the engine to race ahead of the car and at the instant of break-away, the mechanism A is operating in underdrive and the mechanism B in direct drive.

The present transmission arrangement provides an exceptionally flexible vehicle driving mechanism which automatically provides car speed ratio for all conditions of vehicle operation. When driving in overdrive through the unit B with the unit A operating in either direct or reduction drive, rapid acceleration of the vehicle may be obtained without shock to the transmission parts or to the occupants of the vehicle by kick-down operation of the unit B to thereby establish a direct drive between the shafts 20 and 76. Upon reduction of the vehicle speed, as when coming to a stop or when slowing down in traffic, the centrifugal clutch C will disengage and reestablish a reduction drive through the unit A when the speed of the vehicle drops sufficiently so that the springs 66 are able to overcome the friction load on the pawls 62 imposed by torque transmission from shaft 20 to shaft 13. When the vehicle speed drops below the critical speed at which the pump J of the overdrive unit B is designed to operate, the pressure fluid at motor G will, of course, fall off and release the overdrive to thereby immediately reestablish direct drive either at the overrunning clutch E or at the teeth 99, 100 as aforesaid. Various sequences of operation of my improved transmission may be had according to the desires of the operator of the vehicle or other conditions under which the vehicle is desired to be operated. For instance, by proper adjustment of the control mechanism for the pressure fluid from pump J and by varying the compression of the springs 66 of centrifugal clutch C, the speed at which step-up or step-down of the speed ratio in the respective units A and B takes place may be varied within wide limits while in the aforesaid description, it has been assumed that the step-up in drive through the overdrive unit B will take place before the step-up in drive in the underdrive unit A during normal operation of the vehicle. This sequence of operations may be reversed and the mechanism may be so adjusted that step-up in drive can take place through the mechanism A at a lower speed than step-up in drive through the mechanism B. Various other re-arrangements of my improved transmission will readily occur to those skilled in the art. For instance, the overdrive mechanism B may be disposed ahead of the underdrive mechanism A instead of in rear thereof as is illustrated and described.

I therefore do not limit my invention in its broader aspects to the particular combination and arrangement of parts shown and described herein for illustrative purposes since various modifications will be apparent from the teachings herein.

I claim:

1. In a variable speed power transmission having a driving shaft and a driven shaft, means for driving the driven shaft from and at a reduced speed relative to the driving shaft comprising a gear train including a gear journaled on said driven shaft; means for driving the driven shaft in direct drive with the driving shaft comprising a centrifugal member driven by said driving shaft and non-rotatable relative thereto and a second centrifugal clutch member adapted to be clutched by said first mentioned centrifugal clutch member under control of said driving shaft for driving said driven shaft; a toothed clutch member for associating said second centrifugal clutch member in drive with said gear, said toothed clutch member connected by splines to said driven shaft and shiftable axially thereof; a second toothed clutch member having external teeth adapted for engagement by internal teeth on said first toothed clutch member; and an overrunning connection between said second clutch member and said gear, said overrunning connection permitting said driven shaft to overrun said gear in forward direction of rotation when said toothed clutch members are engaged.

2. In a variable speed power transmission, a driving shaft having a drive pinion and a centrifugal clutch member carried thereon; a driven shaft; a shiftable sleeve member drivingly connected to said driven shaft; a centrifugal clutch member operatively associated with said sleeve and misaligned with respect to said first mentioned clutch member, said second clutch member adapted to be moved into aligned position for clutching by said first clutch member by shifting said sleeve from neutral position; a second clutch member carried by said sleeve; a clutch member adapted for engagement by said second clutch member upon shift of said sleeve from neutral position; a speed reducing gear train driven by said pinion, and an overrunning driving connection between said gear train and said last mentioned clutch member.

3. In a variable speed power transmission, a driving pinion; a driven shaft; a clutch associated with said pinion and shaft and adapted when engaged to establish a two way direct driving connection therebetween; a speed reducing gear train driven by said pinion; means for drivingly connecting said gear train with said shaft including an overrunning device adapted to permit said shaft to overrun said gear train when so connected; and said clutch including means operable in response to a predetermined speed of rotation of said pinion accompanied by release of torque through said transmission for causing said clutch to engage.

4. The combination set forth in claim 3 wherein a shiftable member operable by the driver at will is provided for breaking the driving connection between said clutch and shaft and said gear train and shaft respectively.

5. In a variable speed power transmission, a drive pinion; countershaft gears driven by said pinion including a low speed gear and an intermediate speed gear; a driven shaft; a gear splined on said driven shaft and adapted for meshing with said low speed gear; a gear journaled on said shaft in permanent mesh with said intermediate speed gear; means adapted for drivingly connecting said last mentioned gear with said shaft including an overrunning clutch operable to permit said shaft to overrun said gear; and a clutch operatively disposed between said pinion and said shaft and operable to connect the same in a two way direct drive in response to rotation of said pinion at predetermined speed accompanied by release of drive through said transmission.

6. In a variable speed power transmission, a driving structure; a driven structure; a speed responsive clutch operatively associated with said driving and driven structures and operable when engaged to clutch the same for a two-way direct drive; a speed reducing gear train for drivingly connecting said structures, the driving connection thereof including an overrunning clutch operable to permit the driven structure to overrun the driving structure; a clutching sleeve shiftable by the driver at will from a neutral position where it is disengaged with said speed responsive clutch and gear train, said sleeve being adapted for shifting in one direction to connect both said speed responsive clutch and gear train to said driven structure and for shifting in the opposite direction to respectively disconnect said speed responsive clutch from said driven structure and connect said gear train to said driven structure for two way drive.

7. In a variable speed power transmission, a driving pinion, a driven shaft, a clutch associated with said pinion and shaft and adapted when engaged to establish a two-way direct driving connection therebetween, a speed reducing gear train driven by said pinion for driving said shaft in a slower speed ratio drive than said clutch, and an overrunning clutch coaxial with said shaft and intermediate said shaft and gear train adapted to permit said shaft to overrun said gear train when said clutch is engaged, said clutch including means under control of said driving pinion and responsive to a predetermined speed of rotation of said pinion for effecting said two-way drive connection.

EDWIN R. MAURER.